No. 733,590. Patented July 14, 1903.

UNITED STATES PATENT OFFICE.

OTTO MEURER, OF COLOGNE, GERMANY.

PROCESS OF OBTAINING METAL SULFATES FROM MATTES.

SPECIFICATION forming part of Letters Patent No. 733,590, dated July 14, 1903.

Application filed April 21, 1902. Serial No. 103,982. (No specimens.)

*To all whom it may concern:*

Be it known that I, OTTO MEURER, manufacturer, a subject of the German Emperor, residing at 54-56 Mühlenbach, Cologne-on-the-Rhine, Germany, have invented certain new and useful Improvements in Processes for Obtaining Metal Sulfates from Mattes; and I do hereby declare the following to be a full, clear, and exact description of the invention, such as will enable others skilled in the art to which it appertains to make and use the same.

This invention relates to a process for obtaining metal sulfates from mattes, the process being adapted to produce metal sulfates free from iron.

In the American Patent No. 650,980 a method is described for obtaining ferric sulfate and metal sulfates by heating the ores with an alkali polysulfid in absence of air. Any alkali sulfid is applicable to the process, or any mixture capable of producing alkali sulfid during the process may be used. To obtain metal sulfates free from iron by this former process, the ore containing sulfids of metals other than iron is treated; but addition of iron bisulfid may be necessary if the sulfid ore be not sufficiently rich in this material, or, on the other hand, addition of ore free from iron if the sulfid ore contain too much iron. The mass after fusion is allowed to oxidize as before; but on then washing it the iron is left as oxid and the other metal sulfates are extracted.

By the present invention ores poor in metals and ores which have been melted, such as copper or nickel matte, are treated on the same principle; but the sulfid ores are first melted. The object of this preliminary fusion in the case of ores poor in metals is to flux away gangue as a slag. The ore portion prepared in this manner, such as a copper or nickel matte, is disintegrated and well mixed with an alkali sulfate and coal or with ready alkaline sulfids. The mixture is heated to a strong red heat for some two or three hours in a muffle or other suitable furnace from which air is excluded. Instead of an alkali sulfate an alkaline-earth sulfate may be used or a previously-prepared alkali sulfid. After the heating the mass is allowed to crumble in the air. By treating the crumbled mass with water the salts added before the treatment in the muffle-furnace are dissolved and regained. The mass remaining after washing off the salts is dried and submitted to oxidation in a properly-warmed room. The metal sulfates thus formed are washed out, leaving ferric oxid in the residue.

The process can be illustrated by the following equation, in which "R" is a bivalent metal, such as copper, nickel, &c.:

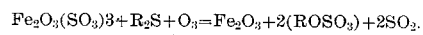

$$Fe_2O_3(SO_3)3 + R_2S + O_3 = Fe_2O_3 + 2(ROSO_3) + 2SO_2.$$

In order, therefore, to obtain the sulfates of metals except iron present in the ores free from iron, it is necessary to regulate the contents of the ore in iron pyrites by maintaining the ratio determined by the above formula between bisulfid of iron or iron monoxid and the metallic sulfid. From five molecules of bisulfid of iron is evolved one molecule of iron monosulfid. For the formation of the metallic sulfate there must be a ratio of two molecules of iron monosulfid to two molecules of metallic sulfid. There must therefore be maintained substantially a mixture ratio of ten molecules iron bisulfid to two molecules metallic sulfid.

In carrying out the invention in practice the mattes are first ground and garbled and mixed with the necessary quantity of pyrites, varying according to the composition of the mattes under treatment, as stated above, and ten to fifteen per cent. of sulfate of soda and the corresponding quantity of coal or with ready alkaline polysulfids or one may take an alkaline earth instead of alkali. The mixture is then heated to such a temperature that the polysulfids are molten. The heating must be executed in a muffle-furnace of suitable form. The mass having been heated for a suitable time, easily to be ascertained by experience, is removed from the furnace and allowed to crumble in the air by the absorption of moisture therefrom, which action usually takes place in the course of four to eight days, dependent upon the freedom of access of the air to the mass. By treating the crumbled mass with water the salts added to the ores before the treatment in the muffle-furnace are dissolved and may be regained from the solutions by lixiviation and crystallization in the usual way. The mass remaining after this lixiviation, and which consists largely of metal sulfids, iron monosulfids, and magnetic pyrites, is dried and pulverized and then exposed to the air in a suitably warmed room, preferably at a temperature at which the metallic sulfates are not disassociated, in which a spontaneous glowing of the mass results incident to the formation of metallic sulfates.

The advantage of the process is that the yield of sulfates is high. Moreover, it is possible to treat poor ores containing only little metal, since the preliminary fusion enables the worthless stuffs in the ore to be fluxed away as slag. Furthermore, by this fusion the ore is concentrated, so that a smaller proportion of added alkali sulfid or alkaline-earth sulfid is used than when the crude ore is worked up, and the cost for fuel is diminished.

Having thus described the nature of this invention and the best means I know of carrying the same into practical effect, I claim—

1. The described process for obtaining metal sulfates from ores which process consists in fusing the ore, eliminating the gangue, disintegrating the matte, then mixing such disintegrated matte with iron bisulfid and with the sulfate of an alkali and coal, then heating the mixture in the absence of air, then allowing the mass to crumble in air, and oxidize in air and finally washing the oxidized mass.

2. The described process for obtaining metal sulfates from ores which process consists in fusing the ore, eliminating the gangue, disintegrating the matte, then mixing such disintegrated matte with iron bisulfid and with the sulfate of an alkali and coal, then heating the mixture in the absence of air, then allowing the mass to crumble in air and oxidizing it by exposure to warm air and finally washing the oxidized mass.

3. The described process for obtaining metal sulfates from ores which process consists in fusing the ore, eliminating the gangue and disintegrating the matte, then mixing such disintegrated matte with iron bisulfid and with a sulfate of an alkali and coal, then heating the mixture in the absence of air, then allowing the mass to crumble in air, then washing, drying, and oxidizing and finally washing the oxidized mass.

In testimony whereof I have affixed my signature in presence of two witnesses.

OTTO MEURER.

Witnesses:
CARL SCHMITT,
JOH. SCHOLZ.